United States Patent [19]
Niday

[11] Patent Number: 5,515,928
[45] Date of Patent: May 14, 1996

[54] ALIGNING A THREE-POINT HITCH MOUNTED IMPLEMENT WITH PREDETERMINED ROWS

[76] Inventor: Louis L. Niday, Humeston, Iowa 50123

[21] Appl. No.: 59,420

[22] Filed: May 4, 1993

[51] Int. Cl.⁶ .................... A01B 63/102; A01B 59/043
[52] U.S. Cl. .................................... 172/6; 172/450
[58] Field of Search .................. 172/5, 6, 2, 439, 172/446, 450

[56] References Cited

U.S. PATENT DOCUMENTS

| | | | |
|---|---|---|---|
| 2,935,147 | 5/1960 | Edman et al. | 172/450 |
| 3,047,076 | 7/1962 | Wier et al. | 172/450 |
| 3,910,355 | 10/1975 | Elfes et al. | 172/450 |
| 4,116,458 | 9/1978 | Berg | 172/450 |
| 4,181,181 | 1/1980 | Old | 172/450 |
| 4,397,359 | 8/1983 | Price et al. | 172/450 |
| 4,601,486 | 7/1986 | Marcq | 172/450 |
| 4,616,712 | 10/1986 | Jorgensen | 172/6 |
| 4,640,522 | 2/1987 | Teich | 172/450 |
| 4,726,175 | 2/1988 | Day et al. | 56/10.2 |
| 5,029,650 | 7/1991 | Smit | 172/5 |
| 5,136,828 | 8/1992 | Ermacora | 56/10.2 |
| 5,181,572 | 1/1993 | Andersen et al. | 172/5 |
| 5,201,539 | 4/1993 | Mayfield | 172/450 |
| 5,246,077 | 9/1993 | Tjaden et al. | 172/5 |

FOREIGN PATENT DOCUMENTS

| | | | |
|---|---|---|---|
| 259283 | 1/1968 | Austria | 172/450 |
| 315594 | 5/1989 | European Pat. Off. | 172/450 |

*Primary Examiner*—Randolph A. Reese
*Assistant Examiner*—Spencer Warnick
*Attorney, Agent, or Firm*—Zarley, McKee, Thomte, Voorhees & Sease

[57] ABSTRACT

A row sensing wand triggers a power cylinder to move the upstanding vertical members of a U-shaped guidance frame left or right to move the lift arms of a three-point hitch on which a cultivator is mounted for maintaining it in alignment with the row crops being cultivated. The guidance frame is movably mounted on a guide tube connected to the tractor drawbar.

7 Claims, 2 Drawing Sheets

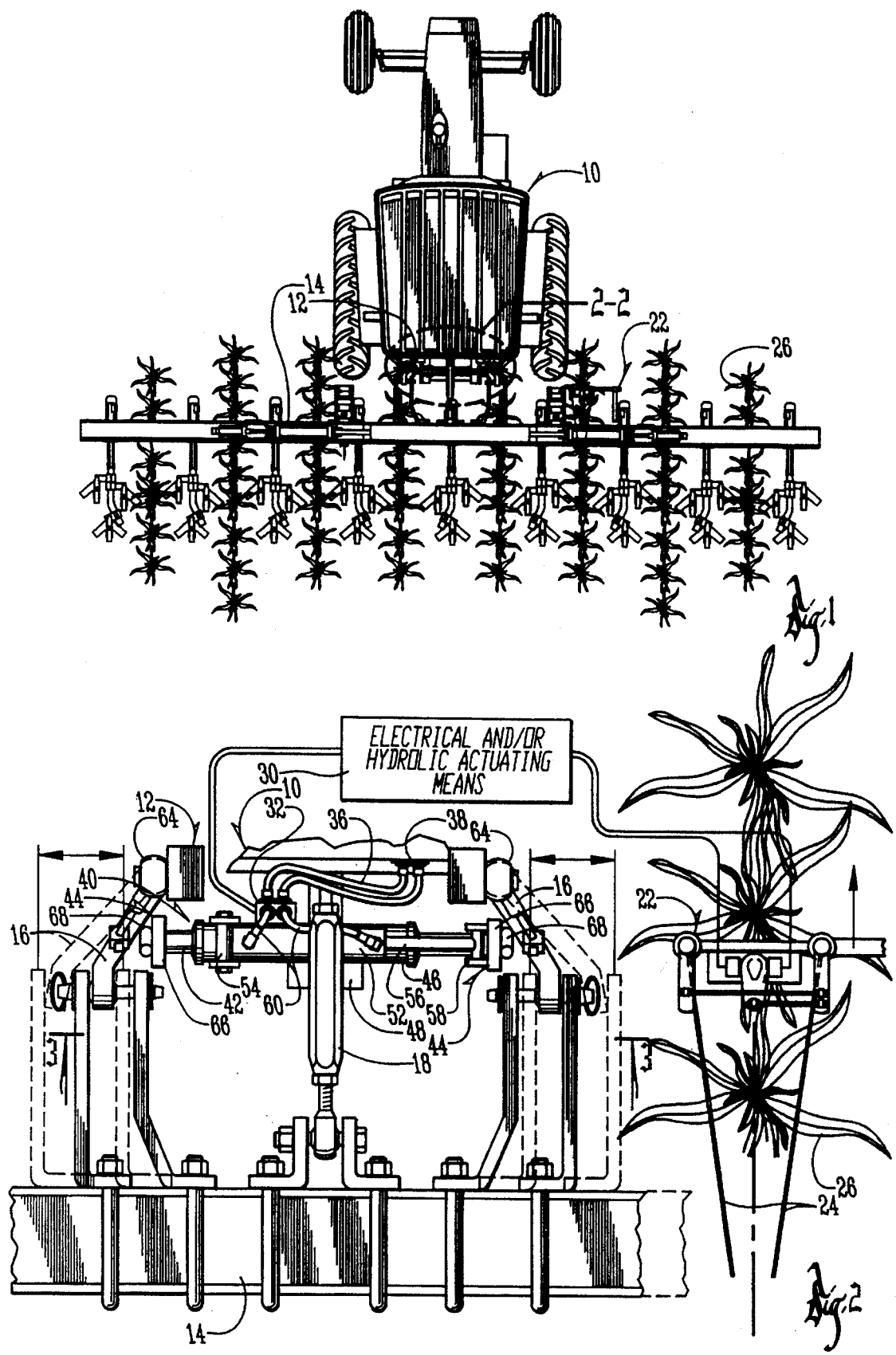

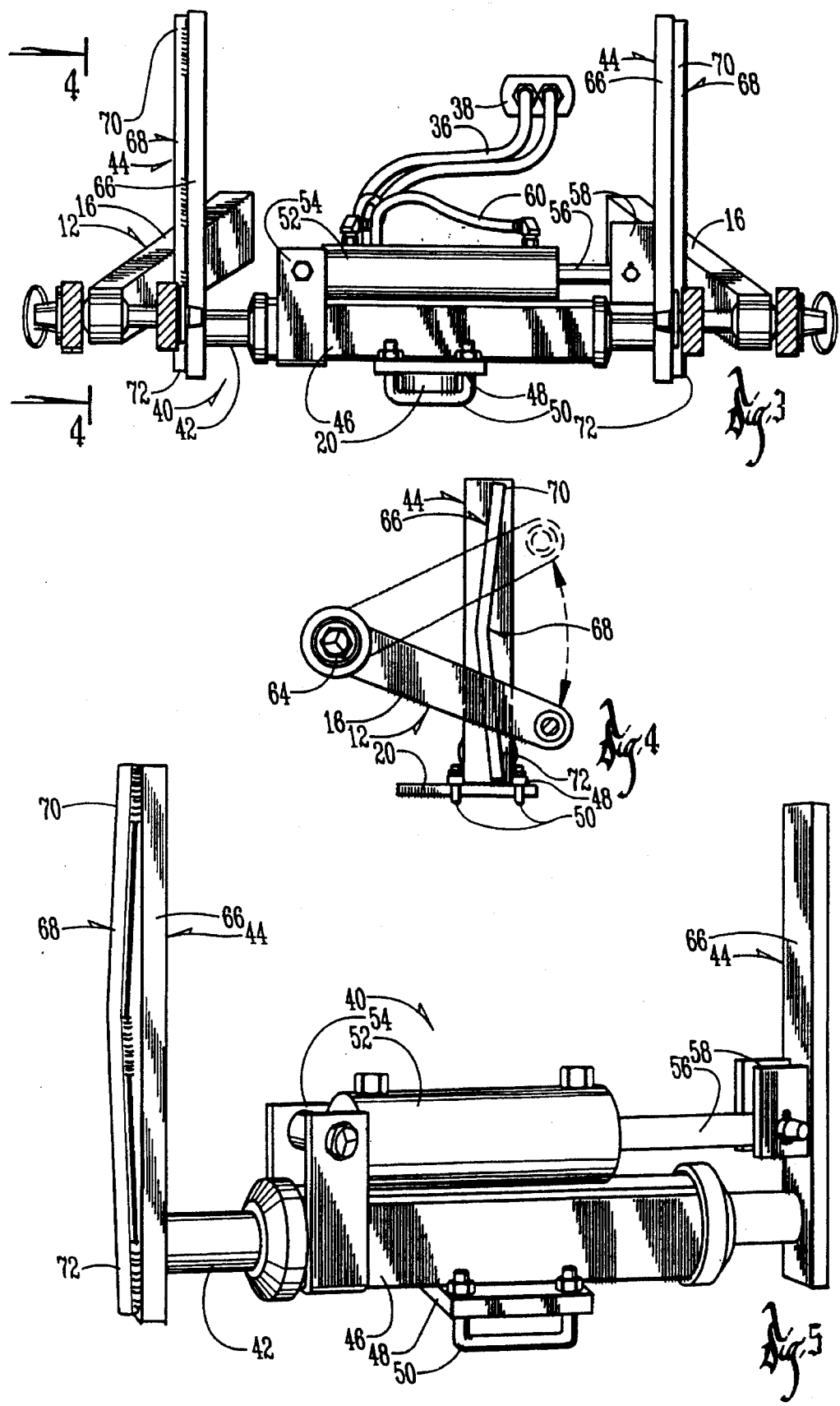

ALIGNING A THREE-POINT HITCH MOUNTED IMPLEMENT WITH PREDETERMINED ROWS

BACKGROUND OF THE INVENTION

Various guidance systems are available that have as their object maintaining the ground working implements such as a cultivator aligned with the rows being cultivated. One approach, for example, is to mount steerable coulters on the cultivator that are responsive to row sensors for steering the cultivator as required for maintaining the desired alignment with the rows. The various systems available all suffer from the fact that they are complicated and expensive. What is needed is a simplified approach that takes advantage of existing three-point hitch equipment built into the tractor.

SUMMARY OF THE INVENTION

The guidance system of this invention takes advantage of the three-point hitch on which the ground working implement such as a cultivator is mounted. The row sensors send a signal to a control connected to a power means which moves the lower lift arms of a three-point hitch from side to side as required to maintain the cultivator aligned with the rows. The lower lift arms at their outer ends can move as much as 8 inches from side to side allowing sufficient lateral shifting of the cultivator to maintain it in alignment with the rows. This is accomplished by mounting a U-shaped frame on the drawbar of the tractor through a guide means which allows the U-shaped frame to move from side to side in response to a power cylinder extending from the guide means to one of the vertical members of the U-shaped frame. The vertical members are positioned between and adjacent the lower lift arms and include outwardly facing surfaces which are shaped to maintain a constant space between the vertical members and the lift arms as the lift arms move from lowered to raised positions. The lift arms extend rearwardly and outwardly, thus the distance along the arms from their pivot axes to the vertical plane of the guidance frame varies throughout raising and lowering, consequently space between the arms and the vertical members varies unless there is compensation for it. The outer facing of the vertical members includes compensation rods having an outer rounded surface extending the length thereof with upper portions extending downwardly and outwardly which merge into lower portions which extend upwardly and outwardly. Thus minimal wear surface is provided on the vertical members which engage the lower lift arms.

The power means for moving the U-shaped guidance frame may include electrical or mechanical systems although a preferred arrangement includes a hydraulic cylinder extending from the guide sleeve mounted on the drawbar to one of the vertical members. Expansion and contraction of the cylinder in turn causes the U-shaped frame to move from side to side and in turn shift the lift arms and implement as required from side to side to maintain alignment with the predetermined rows.

DESCRIPTION OF THE DRAWINGS

FIG. 1 is a top plan view of a tractor and three-point hitch mounted cultivator utilizing the alignment means of this invention.

FIG. 2 is an enlarged fragmentary top plan view thereof as shown by the lines 2—2 in FIG. 1.

FIG. 3 is a cross-sectional view taken along line 3—3 in FIG. 2.

FIG. 4 is a cross-sectional view taken along line 4—4 in FIG. 3 showing the three-point hitch lift arms relative to the vertical members of the U-shaped guidance frame.

FIG. 5 is a rear elevational perspective view of only the guidance frame assembly.

DESCRIPTION OF PREFERRED EMBODIMENT

A tractor 10 in FIG. 1 is shown with a conventional three-point hitch 12 (FIG. 2) to which a cultivator 14 is mounted. The three-point hitch includes lower side lift arms 16 and a centered upper arm 18. As best seen in FIG. 3, the tractor includes a drawbar 20 directly under the center upper arm 18.

A row sensing assembly 22 of conventional design includes sensing wands 24 on opposite sides of plants 26 which establish multiple rows.

If the tractor 10 moves one direction or the other off the center line between the rows, the sensing wands 24 will contact the plants 26 and send a signal to a conventional electrical and/or hydraulic actuating means 30 which in turn is connected to a control valve 32 by wires 34. Hydraulic hoses 36 connect the hydraulic system 38 of the tractor to the control valve 32.

The guidance assembly of this invention referred to generally by the reference numeral 40 in FIG. 5 includes a U-shaped frame having a horizontally extending shaft member 42 to which upstanding vertical members 44 are connected on the shafts opposite ends. The shaft member 42 extends through a guide tube 46 which is rigidly mounted to a mounting plate 48 which in turn is mounted by a U-bolt 50 to the drawbar 20.

A power cylinder 52 is mounted on top of the guide tube 46 by upstanding spaced apart plates 54 at one end. The other end of the cylinder from which the piston rod 56 extends, is connected to the right hand vertical member 44 through mounting plates 58. Hydraulic hoses 60 extend between the power cylinder 52 and the control valve 32. The hydraulic power cylinder 52 is double acting and thus capable of moving the U-shaped frame in either direction from side to side.

The upstanding vertical members 44 are positioned between and closely adjacent the lower lift side arms 16 and allow the arms to pivot about an axis 64 between raised and lowered positions as seen in FIG. 4.

The vertical members 44 have oppositely disposed faces 66 on which elongated continuous one inch in diameter rods 68 are welded. These rods have an upper portion 70 and a lower portion 72. The upper portion 70 extends downwardly and outwardly while the lower portion 72 extends upwardly and outwardly. These rods provide a constant spacing between the vertical members 44 and the lift arms 16 and provide for minimal contact between the vertical members 44 and the lift arm 16 thereby reducing wear on both.

Thus in operation, it is seen the electrical signal generated by the sensing wands 24 will cause the control valve 32 to direct hydraulic fluid from the tractor hydraulic system 38 to the power cylinder 52 to cause it to expand or contract to move the vertical members 44 to the right or to the left thereby moving the lower lift arms 16 between the solid and dash line positions in FIG. 2. Since the implement 14 is carried on the lift arms 16 it will be moved to the right or the left as it is realigned and the sensing wands 24 are recentered along the row of plants 26 as seen in FIG. 2. Thus a simplified fool proof guidance system has been provided taking advantage of the three-point hitch lift system built into most farm tractors.

What is claimed is:

1. A guidance frame for three-point hitches comprising a pair of spaced apart vertical members interconnected by a horizontal member, a guide means engaging said horizontal member adapted to be mounted on a draw bar of a tractor, power means operatively connected to said horizontal member to move said horizontal member relative to said guide means whereby said vertical members are moved from side to side and are adapted for engagement with and movement of a pair of three-point hitch lower lift arms, and said vertical members including oppositely facing surfaces each of which include upper and lower portions, said upper and lower portions include a rod having a rounded outer surface extending the length thereof.

2. The structure of claim 1 wherein said guide means is a tube through which said horizontal member moveably extends.

3. The structure of claim 1 whereby said power means is a hydraulic cylinder mounted on said guide means and is connected by said operative connection to one of said vertical members for moving said vertical members in unison from side to side.

4. A tractor with three point hitch and guidance frame comprising, said three-point hitch having an upper lift arm centered over a pair of lower spaced apart lift arms, said guidance frame including a pair of vertical members interconnected by a horizontal member, said vertical members extending between and closely adjacent said lower lift arms, a guide means mounted on a drawbar and engaging said horizontal member, power means operatively connected to said horizontal member to move said horizontal member relative to said guide means whereby said vertical members are moved from side to side for engagement with and movement of said pair to lower lift arms, and said vertical members including oppositely facing surfaces each of which include upper and lower portions, said upper and lower portions include a rod having a rounded outer surface extending the length thereof.

5. The structure of claim 4 wherein said horizontal member engages said vertical members at their lower ends.

6. The structure of claim 4 wherein said guide means is a tube through which said horizontal member moveably extends.

7. The structure of claim 4 whereby said power means is a hydraulic cylinder mounted on said guide means and is connected by said operative connection to one of said vertical members for moving said vertical members in unison from side to side.

* * * * *